UNITED STATES PATENT OFFICE.

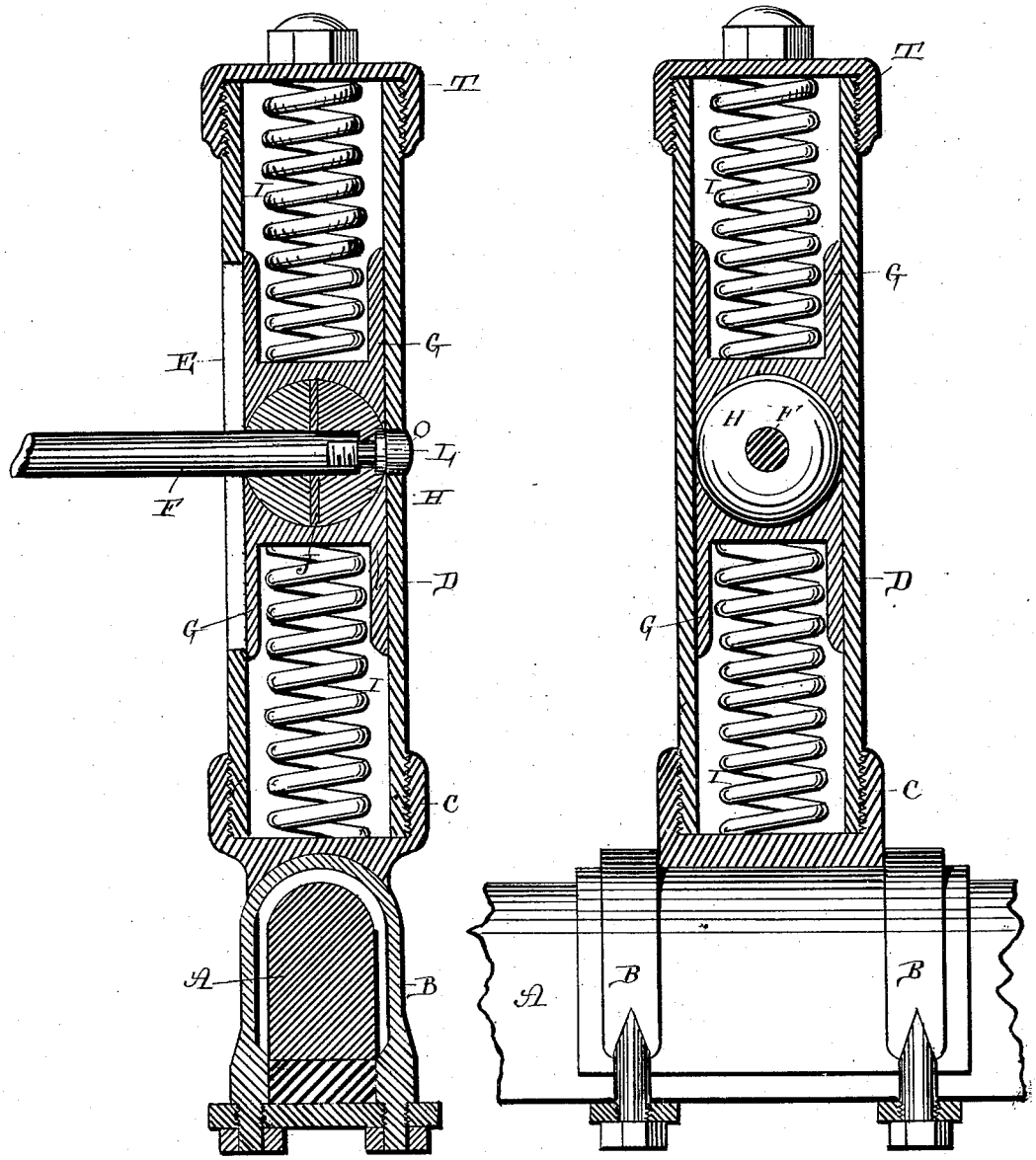

MARION A. WINGET, OF COLUMBUS, OHIO, ASSIGNOR TO F. R. WINGET, OF SAME PLACE.

VEHICLE-SPRING.

SPECIFICATION forming part of Letters Patent No. 301,944, dated July 15, 1884.

Application filed November 28, 1883. (No model.)

*To all whom it may concern:*

Be it known that I, M. A. WINGET, of Columbus, in the county of Franklin and State of Ohio, have invented certain new and useful Improvements in Vehicle-Springs; and I do hereby declare the following to be a full, clear, and exact description of the invention, such as will enable others skilled in the art to which it pertains to make and use it, reference being had to the accompanying drawings, which form part of this specification.

My invention relates to an improvement in vehicle-springs; and it consists in the combination of a suitable slotted cylinder, two guides which are placed therein, a spring for each guide, and a round bearing to which one end of the supporting-rod is secured, as will be more fully described hereinafter.

The object of my invention is to construct a cheap and simple spring, whereby the upward throw of the body of the vehicle, after it has struck an obstruction or run into a rut, is avoided, and thus entirely dispense with the second jolt which the body receives from this cause.

Figures 1 and 2 are vertical cross-sections of a spring embodying my invention.

A represents the axle, and B an ordinary clip. Secured upon the top of one of these clips, or between two of them, as shown in Fig. 2, is secured a suitable internal screw-threaded socket, C, into which the lower end of the cylinder D is screwed. This cylinder D will be of any desired length, and has a slot, E, made through one side, so that the rod F, which is secured to the under side of the body of the vehicle, can pass freely through it. Upon the upper end of this cylinder will be placed a suitable cap, T, which is made removable, so that the springs and other parts can be removed whenever desired. If preferred, this cylinder D and the socket C may be formed in a single piece, as I do not limit myself to any detail of construction in this respect. In this cylinder are placed the two sliding guides G, which bear against opposite sides of the ball or bearing H. These guides will be made of sufficient length to insure their always moving perfectly straight in the cylinder, and are provided with suitable sockets in their outer ends, so as to receive the inner ends of the springs I. These springs bear against the under side of the top and the top of the socket, and thus force the two guides G always toward the center. In between these two guides G is placed a spherical bearing, H, to which the outer end of the rod F is secured in any suitable manner. This bearing H is formed of two pieces, which are separated a suitable distance from each other by means of washers J, made of rubber, leather, or any other suitable elastic material. After the end of the rod F has been passed through one of the parts of the bearing and partly through the other it is secured rigidly to them by means of a screw, L, as shown in Fig. 1. This screw L serves both to secure this bearing H to the rod F and to secure the two parts of the bearing together. The washer in between the two parts of the bearing serves to counteract any end-thrust of the rod F, and thus cause the body of the vehicle to move as easily as possible. This bearing H, being made spherical, as shown, can turn freely in between the guides G, and thus prevent any unnecessary binding or friction between the parts. There being two springs I used, the lower one serves to break any jar or concussion when the body is dropping forward, as when the wheels run into a rut or strike an obstruction, while the upper spring serves to prevent that sudden rise or reaction which always causes a second jolt to the body, and which is even more unpleasant than the first. The two springs I and the bearing between them serve to equalize any movement in either direction, and thus prevent any unpleasant recoils. Through the outer side of each cylinder will be made an opening, O, which is closed by means of a screw-block, and this opening comes just opposite the screw L when in its normal position, and thus the rod F can be separated from the bearing H at any time without the necessity of removing any other parts.

Having thus described my invention, I claim—

1. The combination of the slotted cylinder, the two guides, the two springs applied to opposite sides of the guides, and a bearing to which the rod F is secured, the bearing being placed between the guides, substantially as shown.

2. The combination of the slotted cylinder, the springs, the guides, the rod F, and the spherical bearing H, which is made in two parts, and the washer which is clamped between the two parts, substantially as described.

In testimony whereof I affix my signature in presence of two witnesses.

MARION A. WINGET.

Witnesses:
JOSEPH M. LOWE,
LORENZO D. HAGERTY.